# 3,086,877
Patented Apr. 23, 1963

3,086,877
TREATMENT OF TITANIUM DIOXIDE PIGMENT
Gerard M. Sheehan and Earl R. Lawhorne, Lynchburg, Va., assignors to American Cyanamid Company, New York, N.Y., a corporation of Maine
No Drawing. Filed Nov. 1, 1960, Ser. No. 66,425
7 Claims. (Cl. 106—300)

The present invention relates to the treatment of titanium dioxide pigment to improve its weathering characteristics. More particularly, the invention relates to the treatment of titanium dioxide pigment with sodium aluminate for the aforementioned purpose.

Whately U.S. Patent No. 2,671,031 (1954) discloses in its Example 9 that titanium dioxide pigment, treated by forming the pigment into a slurry, adding first sodium aluminate solution and then sulfuric acid thereto, washing the pigment and heating the pigment briefly at 800° C., is improved as to its weathering characteristics. The weathering characteristics of a pigment are often termed its "chalk resistance."

The discovery has now been made that titanium dioxide pigment of substantially superior weathering properties is produced when the sulfuric acid is added first, and the sodium aluminate solution is added thereafter.

The weathering properties of the resulting pigment, after washing and drying, are between those of the non-heat treated and the heat-treated pigment of Example 9 of the Whately patent. However, the pigment of the present invention may be heat-treated as described in the Whately patent, and it will be found that this treatment causes a further increase in its weathering properties, so that the resulting pigment is superior to the pigment of the Whately patent.

A series of laboratory experiments shows that the effect of the several treatments is about as follows in improving the weathering characteristics of the pigment.

| Run No. | Reagents Added | | Heat Treatment | Hours to Initial Chalk |
|---|---|---|---|---|
| | First | Second | | |
| 1 | Aluminate | Acid | No | 150 |
| 2 | Acid | Aluminate | No | 250 |
| 3 | Aluminate | Acid | Yes | 350 |
| 4 | Acid | Aluminate | Yes | 450 |

The data represented by the above have thus shown that addition of the acid before the sodium aluminate makes a major improvement in the weathering properties of the pigment. The data further show that after the heat treatment step, the pigment of the present invention is substantially better than corresponding pigment of the Whately patent after the same heat treatment.

More in detail, according to the invention, an aqueous slurry of titanium dioxide pigment is prepared at any convenient solids content (normally 15%–30% by weight). The pigment may be flocculated or defluocculated as preferred. A strong acid (i.e., an acid which dissociates more than 10% as a 1 N solution in water, for example sulfuric acid, hydrochloric acid, trichloracetic acid or nitric acid) is then added, after which aqueous sodium aluminate solution is added with stirring in amount approximately sufficient to neutralize the slurry.

The addition of as little as 0.1% sodium aluminate calculated as $Al_2O_3$ on the dry weight of the pigment produces a perceptible improvement, and there is little advantage in adding more than 5% of sodium aluminate, calculated on the same basis, so these percentages are the practical limits of the amount of sodium aluminate to be added according to the present invention. Best improvement in weathering characteristics per increment of sodium aluminate added occurs in the range 1%–3%, which is therefore preferred.

The amount of strong acid and sodium aluminate added, and the amount of water in the slurry are predetermined so that the slurry is about neutral (i.e., is in the pH range of about 6–8) when addition of the sodium aluminate solution is substantially complete. However, the process depends upon the initial presence of sufficient acid to impart a pH of at least 4 to the slurry (this being below the isoelectric point of colloidal hydrous aluminum oxide). Better results have been observed when the pH of the slurry is substantially below its isoelectric point (for example pH 1) at the start of the addition of the sodium aluminate, so that a preponderant part of the sodium aluminate reacts below the isoelectric point of the hydrous aluminum oxide. Suitable amounts of acid may be calculated or may be found by laboratory trial. However, the reason why the addition of acid first is better than the addition of acid last is not known, and we do not wish to be bound by any theory.

The reaction between the acid and the sodium aluminate proceeds satisfactorily in the range 20° C.–70° C., so that evidently the invention does not depend upon the particular temperature used. It is advantageous to stir the slurry moderately during addition of the sodium aluminate solution so as to cause uniform reaction of the aluminate with the acid and thereby prevent local overneutralization.

After addition of the sodium aluminate has been completed, if desired, the pigment may be heat-treated. The minimum temperature suitable for the purpose is about 500° C. and higher temperatures up to those generally employed for the calcination of titania hydrate can be employed generally about 900° C.–1200° C. The pigment is maintained at a temperature within the range stated until the hydrous alumina is at least partially dehydrated, as evidenced by an increase in the chalk resistance of the pigment. Good results are obtained with no more than a few minutes of heating between 500° C. and 800° C. This range does not significantly adversely affect the pigment and is therefore preferred.

It is within the scope of the invention to apply other metal hydrous oxides (including hydrous silica) along with the hydrous alumina, and to coat or admix the pigment with dispersing aids.

The pigment may then be milled and packed.

The invention will be described more particularly with relation to the examples. These examples constitute specific embodiments of the invention and are not to be construed as limitations thereon.

*Example 1*

The following illustrates the treatment of titanium dioxide pigment with sodium aluminate solution according to the present invention.

To a hydroclassified slurry of titanium dioxide pigment at room temperature (consisting essentially of 200 g. of deflocculated titanium dioxide pigment in 800 cc. of water) is added 28.8 g. of 10% sulfuric acid with stirring. The pigment flocculates and the pH of the suspension drops to 1.5. To this with gentle agitation is added sufficient (about 10 cc.) of a solution containing sodium aluminate equivalent to 1.77 g. of $Na_2O$ and 2.0 g. of $Al_2O_3$ to neutralize the slurry to pH 7. After aging for two hours the slurry is dewatered and the pigment is washed, dried and jet milled in a fluid energy mill driven by super-heated steam at 115 lb./in.² pressure having a temperature of 480° F.

The chalk resistance of this pigment falls between the pigment of Example 9 of the Whately patent before and after heat treatment.

Example 2

Pigment prepared by the method of Example 1 is heated in an electric furnace at 800° C. for 10 minutes and jet milled. The chalk resistance of the pigment is superior to that of the pigment of Example 1.

We claim:

1. In the treatment of titanium dioxide pigment with sodium aluminate, the improvements which comprise forming an aqueous slurry of titanium dioxide pigment containing sufficient of a strong acid which dissociates more than 10% as a 1 N solution in water to impart to said slurry a pH less than 4, and adding thereto aqueous sodium aluminate solution until the pH of said slurry is between 6 and 8.

2. A process according to claim 1 wherein the slurry contains sufficient strong acid to impart thereto a pH less than 1.

3. A process according to claim 1 wherein the amount of acid in said slurry is sufficient to neutralize sodium aluminate in amount equivalent to between 0.1% and 5% as $Al_2O_3$ based on the dry weight of said pigment.

4. A process according to claim 1 wherein the amount of acid in said slurry is sufficient to neutralize sodium aluminate in amount equivalent to between 1% and 3% as $Al_2O_3$ based on the dry weight of the pigment.

5. A process according to claim 1 wherein the strong acid is sulfuric acid.

6. In the treatment of titanium dioxide pigment with sodium aluminate, the improvements which comprise forming an aqueous slurry of titanium dioxide pigment containing sufficient of a strong acid which dissociates more than 10% as a 1 N solution in water to impart to said slurry a pH less than 4, adding thereto aqueous sodium aluminate solution until the pH of said slurry is between 6 and 8, thereby forming hydrous alumina and heating said pigment at a temperature between about 500° C. and 1200° C. until the chalk resistance of the pigment has increased.

7. A process according to claim 6 wherein the pigment is heated between about 500° C. and 800° C. for about 10 minutes.

References Cited in the file of this patent

UNITED STATES PATENTS

| | | |
|---|---|---|
| 2,233,358 | Nutting | Feb. 25, 1941 |
| 2,357,101 | Geddes | Aug. 29, 1944 |
| 2,671,031 | Whately | Mar. 2, 1954 |